Aug. 4, 1970

O. BACKMAN ETAL
3,522,517

DEVICE FOR CONVERTING A VARIABLE DIRECT VOLTAGE TO A
SUBSTANTIALLY CONSTANT ALTERNATING VOLTAGE

Filed April 17, 1968

INVENTOR.
OWE BACKMAN
MARIUS WIDAKOWICH
BY
Jennings Bailey

United States Patent Office 3,522,517
Patented Aug. 4, 1970

3,522,517
DEVICE FOR CONVERTING A VARIABLE DIRECT VOLTAGE TO A SUBSTANTIALLY CONSTANT ALTERNATING VOLTAGE
Owe Backman, Nacka, and Marius Widakowich, Bromma, Sweden, assignors to Allmanna Svenska Elektriska Aktiebolaget, Vasteras, Sweden, a Swedish corporation
Filed Apr. 17, 1968, Ser. No. 722,119
Claims priority, application Sweden, Apr. 18, 1967, 5,349/67
Int. Cl. H02m 1/08
U.S. Cl. 321—16                                            2 Claims

ABSTRACT OF THE DISCLOSURE

In a DC/AC converting device of the kind in which an inverter is connected in series with a voltage stabilising transformer of the ferro-resonant type, the current which must be commutated is normally very high. To reduce this current and at the same time obtain an improved voltage regulation and less distortion in the output voltage, an unsaturated series reactor is connected between the inverter and the primary winding of the transformer.

BACKGROUND OF THE INVENTION

Field of the invention

The present invention relates to a device for converting direct voltage to alternating voltage, comprising an inverter and a regulating means for maintaining the alternating voltage constant regardless of possible variations in the direct voltage.

The prior art

The voltage-stabilising means comprises a transformer fed by the inverter, in which transformer a magnetic leakage path is arranged between the primary and secondary windings, and a capacitor arranged in a parallel circuit to the secondary winding. The stabilising effect of said means is caused by the fact that the secondary winding of the transformer and the capacitor connected in parallel to this winding are so adapted to each other that at normal voltage and frequency they form a ferro-resonance circuit. Due to the leakage path arranged between the primary and secondary winding, therefore, the conditions on the secondary side when a resonance oscillation has arisen will only be affected by the magnitude of the primary voltage to a negligible degree.

The use of voltage-regulating transformers of the above mentioned type in connection with inverters involves special problems for the commutation of the inverter. The core of such a transformer is strongly saturated. Accordingly the primary current increases extremely rapidly towards the end of each voltage half-wave and has a very high value when commutation is to take place. The current peaks are of course particularly great when the device operates at the upper limit of the direct voltage range and the current inceases further when the load is inductive since the load current and the magnetising current then have substantially the same phase angle. This has an unfavourable influence on the dimensioning of the commutating circuits of the inverter. The components in these circuits must be dimensioned for the highest instantaneous current which can be expected to arise and they will therefore be large and expensive in comparison with the rated current of the device.

SUMMARY OF THE INVENTION

According to the present invention the above mentioned disadvantage is avoided by connecting an unsaturated reactor between the inverter and the primary winding of the transformer. In the middle of each voltage half-wave when the primary current has a low instantaneous value, the reactance of the transformer is considerably greater than that of the reactor so that the reactor is then substantially inoperative. Towards the end of the half-wave, however, when the transformer core has been saturated, the reactor will come into operation with the result that the current which must be commutated is mainained within very reasonable limits. The size of the components in the commutation circuits of the converter can thus be considerably decreased, which in turn makes possible a considerable reduction in the size and cost of the device. At high primary voltage the current-limiting effect of the reactor will come into effect at an earlier stage of the half-wave and thus contributes to an improved voltage regulation. The reactor also has a favourable influence on the wave form of the secondary voltage. This is because the voltage absorbing influence of the reactor is most noticeable at the beginning and end of each half-wave, since the magnitude and rate of rise of the primary current are greatest then. The reactor thus causes the wave form of the voltage supplied to the primary side of the transformer to be not entirely square, but to have rounded edges.

A transformer of the type in question is usually provided with a so-called feedback or compensating winding magnetically tightly connected to the primary winding which is counter-connected to the secondary winding so that the voltage stabilisation is even further improved. However, this arrangement causes an increased distortion in the secondary voltage. This is because the voltage wave form of the compensating winding is identical to the substantially square primary voltage supplied to the transformer. The output voltage will thus consist of the substantially sine shaped voltage of the secondary winding and the square-shaped voltage of the compensating winding. The last-mentioned voltage is relatively small but, despite this, it causes distortion of the curve shape of the output voltage which is unsatisfactory in certain cases. According to a further embodiment of the invention, a parallel resonance circuit tuned to the basic frequency of the alternating voltage is arranged in parallel with the compensating winding. This circuit has high reactance at the basic frequency of the voltage, while its reactance at the higher harmonica is relatively small. The compensating winding will thus be loaded through the parallel resonance circuit by currents of higher harmonics, for which the unsaturated series reactor on the primary side of the transformer acts as a voltage-absorbing element. The wave form of the voltage which is applied to the primary side of the transformer will thus be improved. Due to the cooperation of the unsaturated reactor with the parallel resonance circuit, it is possible in this way to achieve a considerable reduction in the total distortion.

The unsaturated reactor arranged according to the invention thus contributes in many ways to the improvement of the converting device. Besides its primary purpose of limiting the commutation current, it will also cause an improvement in the voltage regulation and also in the wave form of the output voltage. This latter is particularly effective when the reactor is used in connection with the above-mentioned parallel resonance circuit.

BRIEF DESCRIPTION OF THE DRAWINGS

One embodiment of the invention will now be described in more detail with reference to the accompanying drawings in which.

DESCRIPTION OF THE PREFERRED EMBODIMENTS

Figure 1:
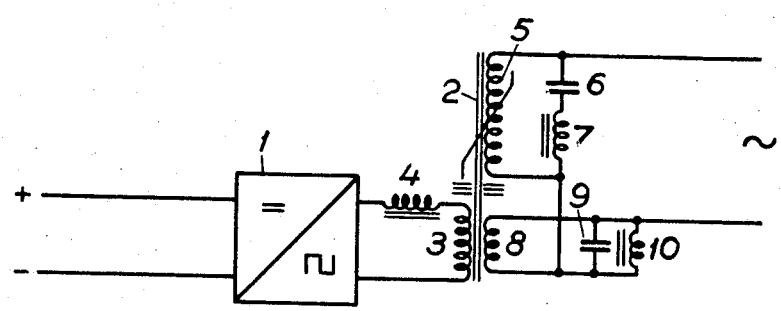
FIG. 1 shows a diagrammatic sketch of a converting device according to the invention and FIG. 2 shows in section a transformer for inclusion in the device according to FIG. 1.
Figure 2:
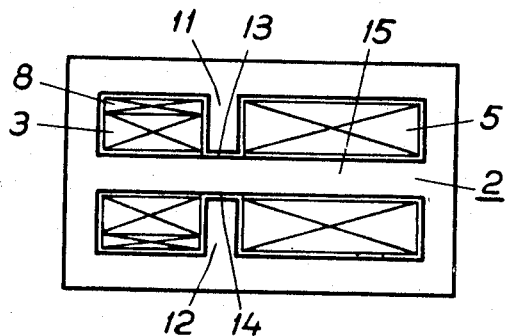

The converting device shown in FIG. 1 comprises a semi-conductor inverter 1 fed by a battery the voltage of which may vary within certain limits. The alternating voltage, however, is maintained substantially constant with the help of a voltage-stabilising transformer, known per se, the construction of which is shown in FIG. 2

The core of the transformer is in principle constructed in the same way as a conventional sheath transformer core by means of E and I-shaped iron sheet elements. The primary winding 3 and secondary winding 5 of the transformer are situated on the central leg 15 of the transformer and between the two windings are two transverse yoke parts 11 and 12 with air gaps 13 and 14 forming leakage paths. The compensation winding 8 connected in series with the secondary winding 5 is wound around the primary winding 3 so that the same flux will flow through it as through the primary winding.

The principally square voltage generated by the inverter 1 is supplied to the primary winding 3 of the transformer through an unsaturated reactor 4. The secondary winding 5 of the transformer is connected in parallel with a circuit consisting of a capacitor 6 connected in series with a reactor 7. The capacitor 6 is adapted to the reactance of the secondary winding 5 so that at nominal voltage and frequency the conditions for ferro-resonance are fulfilled in the circuit in which they are connected. The reactor 7 is tuned to the capacitor 6 for resonance at the third harmonic so that this frequency is filtered off. The compensating winding 8 connected in series with the secondary winding 5 is, as mentioned above, magnetically tightly connected to the primary winding and its voltage thus has the same wave form as that which is supplied to the primary winding of the transformer.

In order to improve the wave form of the voltage of the compensating winding, which is normally substantially square, a parallel-resonance circuit consisting of a capacitor 9 and a reactor 10 is connected in parallel with the compensating winding.

We claim:

1. A device for converting direct voltage to alternating voltage, said device comprising an inverter and a regulating means for maintaining the alternating voltage substantially constant regardless of possible variations in the direct voltage, said regulating means comprising a transformer having primary and secondary windings, said transformer having a magnetic leakage path between said primary and secondary windings, said primary winding being fed from said inverter, a parallel circuit connected across said secondary winding, a capacitor connected in series in said parallel circuit, said capacitor being so adapted to said secondary winding that at normal voltage and frequency a ferro-resonance oscillation arises in the circuit formed by said capacitor and said secondary winding, wherein the improvement comprises an unsaturated series reactor connected between said inverter and the primary winding of said transformer, said reactor having a reactance which is substantially less than that of the transformer in the middle of each voltage half-wave, whereby it exerts a substantial effect on the current only at the end of each voltage half-wave.

2. A device according to claim 1, wherein the secondary winding is connected in series with a compensating winding magnetically tightly coupled to the primary winding and a resonance circuit tuned to the basic frequency of the alternating voltage is connected in parallel with said compensating winding.

References Cited

UNITED STATES PATENTS

| | | | |
|---|---|---|---|
| 2,326,465 | 8/1943 | Keeler. | |
| 2,804,588 | 8/1957 | Hjermstad | 321—16 |
| 2,825,024 | 2/1958 | Berghoff | 323—61 |
| 3,041,523 | 6/1962 | Kuba | 321—9 XR |
| 3,061,769 | 10/1962 | Smyth | 321—16 |
| 3,341,766 | 9/1967 | Rhyne | 321—45 XR |
| 3,354,381 | 11/1967 | Temple | 321—45 |

W. M. SHOOP, JR., Primary Examiner

U.S. Cl. X.R.

323—60; 321—44